United States Patent [19]
Yanagawa et al.

[11] Patent Number: 4,958,897
[45] Date of Patent: Sep. 25, 1990

[54] THIN FILM OPTICAL COMPONENT FOR USE IN OPTICAL TRANSMISSION LINES AND METHOD OF MANUFACTURING THE SAME

[75] Inventors: Hisaharu Yanagawa; Toshihiro Ochiai; Hirokazu Hayakawa; Hidehisa Miyazawa, all of Ichihara, Japan

[73] Assignee: The Furukawa Electric Co., Ltd., Tokyo, Japan

[21] Appl. No.: 367,769

[22] Filed: Jun. 16, 1989

[30] Foreign Application Priority Data

Jun. 29, 1988 [JP] Japan .................................. 63-159357
Oct. 27, 1988 [JP] Japan .................................. 63-269551

[51] Int. Cl.⁵ .............................................. G02B 6/26
[52] U.S. Cl. .................................... 350/96.15; 350/316; 350/320
[58] Field of Search ................ 350/96.15, 96.16, 96.18, 350/96.19, 96.20, 316, 320

[56] References Cited

U.S. PATENT DOCUMENTS 3,779,628 12/1973 Kapron et al. .................... 350/96.15
3,825,319 7/1974 Cook et al. ........................ 350/96.15
4,261,640 4/1981 Stankos et al. .................... 350/96.15
4,452,505 6/1984 Gasparian ......................... 350/96.15
4,541,159 9/1985 Michel et al. ................. 350/96.15 X
4,637,682 1/1987 Mahlein et al. ................... 350/96.15
4,693,546 9/1987 Lorenzo et al. ............. 350/96.15 X
4,763,976 8/1988 Nolan et al. ...................... 350/96.15

FOREIGN PATENT DOCUMENTS 0037057 3/1981 European Pat. Off. .

Primary Examiner—John D. Lee
Attorney, Agent, or Firm—Frishauf, Holtz, Goodman & Woodward

[57] ABSTRACT

An optical component and a manufacturing method therefor are provided, in which an optical member is arranged across a spot-size enlarged portion of an optical fiber. The spot-size enlarged portion is formed either by heating and drawing an optical fiber to reduce its diameter or by diffusing core dopant of an optical fiber outwardly while heating the same. The optical component functions as an optical filter, an optical attenuator, a polarizer, a wavelength division multiplexer/demultiplexer or the like, depending on selection of the optical member.

10 Claims, 6 Drawing Sheets

THIN FILM OPTICAL COMPONENT FOR USE IN OPTICAL TRANSMISSION LINES AND METHOD OF MANUFACTURING THE SAME

BACKGROUND OF THE INVENTION

The present invention relates to an optical component for use in optical transmission lines comprising optical fibers, such as an optical filter, optical attenuator, polarizer, wavelength division multiplexer/demultiplexer and the like, and a method of manufacturing the same.

Conventional optical components used in optical transmission lines comprising optical fibers, for example, an optical filter, include a built-in lens for converging light emitted from an end face of the optical fiber, thus requiring a large number of component parts. Moreover, optical components of this type require adjustment of the optical axis between the lens and the optical fiber, which complicates the manufacturing process and increases the cost.

On the other hand, a lensless component such as a wavelength division multiplexer/demultiplexer shown in FIG. 1 is also known, in which a filter film 13, formed from a dielectric multilayer film, is arranged across a main-path optical fiber 11 and obliquely relative thereto. A branch-path optical fiber 12 has one end thereof arranged at the peripheral surface of the main-path optical fiber 11 such that the reflected light from the filter film 13 is incident to the branch-path optical fiber 12. In this arrangement, the property of the filter film 13 of transmitting light with wavelength $\lambda_1$ therethrough but reflecting light with wavelength $\lambda_1$ is used to achieve wavelength division multiplexing/demultiplexing.

The filter film used in this type optical component generally has a wavelength-transmissivity characteristic as indicated by the solid line in FIG. 2, which is obtained when parallel rays of light are incident to the filter film. In the wavelength division multiplexer/demultiplexer as shown in FIG. 1, however, the light actually incident to the filter film 13 is not parallel light, but guided light being propagated through the optical fiber 11. The guided light of an optical fiber is considered a composition of innumerable plane waves inclined at an angle of $0 \leq \theta \leq \theta_{MAX}$ to the center axis LA (optical axis) of the optical fiber, as shown in FIG. 3 ($\leq_{MAX}$ is determined by the numerical aperture (NA) of the optical fiber). Accordingly, the wavelength-transmissivity characteristic of the filter film varies as indicated by the broken line in FIG. Z, so that the flat portion at the top of the characteristic curve is narrowed. Narrowing of the flat portion results in deterioration of the filter characteristic and the performance of the wavelength division multiplexer/demultiplexer.

The foregoing is also the case with other optical components in which a filter film is arranged across an optical fiber, such as an optical filter or an optical attenuator, and a polarizer, etc.

OBJECTS AND SUMMARY OF THE INVENTION

An object of the present invention is to provide an optical component with excellent optical properties such as a filter characteristic, and a method of manufacturing the same.

Another object of the present invention is to provide an optical component which does not use a lens for converging light emitted from an end face of an optical fiber and thus ia composed of a smaller number of component parts, and which can be manufactured easily and is reduced in cost and size, and a method of manufacturing such an optical component.

An optical component of the present invention comprises an optical fiber having a spot-size enlarged Portion in which a spot size is enlarged, and an optical member arranged across the spot-size enlarged portion of the optical fiber.

The optical component functions as an optical filter if the optical member is a filter film for transmitting light with a specific wavelength therethrough, and functions as an optical attenuator if the optical member is a light absorbing film for attenuating light.

When the optical fiber comprises a polarization maintaining fiber and the optical member comprises a polarization splitting film, then the optical component functions as a polarizer.

Furthermore, the above optical fiber may be used as a main-path optical fiber, with additional use of a branch-path optical fiber which has an end face opposed to a peripheral surface of the spot-size enlarged portion of the main-path optical fiber and which has an optical axis inclined with respect to an optical axis of the main-path optical fiber. The optical member, in this case, comprises a filter film which transmits light with a specific wavelength therethrough and reflects light with wavelengths other than the specific wavelength, and is arranged at the spot-size enlarged portion and inclined with respect to the optical axis of the main-path optical fiber. The optical axes of the main-path optical fiber and the branch-path optical fiber are aligned with each other through the optical member, whereby the optical component functions as a wavelength division multiplexer/demultiplexer.

The optical component described above can be produced easily by a method comprising the steps of securing an optical fiber having a spot-size enlarged portion in which a spot size is enlarged, to a base member, forming a slit across the spot-size enlarged portion of the optical fiber, and fitting an optical member in the slit. Alternatively, the optical component can be produced by a method comprising the steps of preparing a pair of optical fibers, each having a spot-size enlarged end portion in which a spot size is enlarged, and a base member having a guide groove, placing the optical fibers in the guide groove, with faces of the spot-size enlarged end portions opposed to each other, and aligning axes of the optical fibers with an optical member interposed between the opposed end faces of the optical fibers, and securing the optical fibers and the optical member to the base member.

To enlarge the spot size of a certain portion of the optical fiber, the portion may be heated and drawn to reduce its core diameter, or core dopant may be diffused outwardly while heating the fiber. By diffusing the core dopant outwardly, the difference in specific refractivity $\Delta$ lowers and the core diameter increases, whereby the spot size is enlarged.

The above and other objects, features and advantages of this invention will become more apparent from the ensuing detailed description taken in connection with the accompanying drawings.

DETAILED DESCRIPTION

Figure 1:
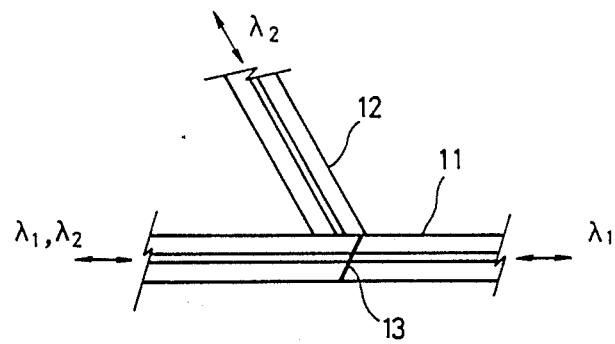
FIG. 1 is a plan view showing an arrangement of a prior art wavelength division multiplexer/demultiplexer.
Figure 2:
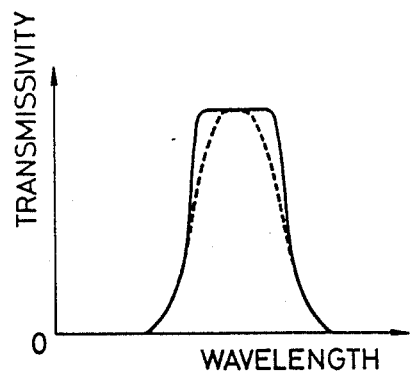
FIG. 2 is a graph showing a wavelengthtranamissivity characteristic of a filter film formed from a dielectric multilayer film.
Figure 3:
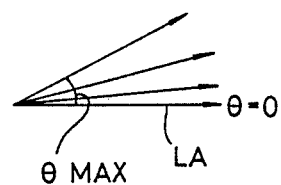
FIG. 3 is a diagram showing guided light of an optical fiber, expressed by its plane components inclined relative to an optical axis LA.
Figure 4:
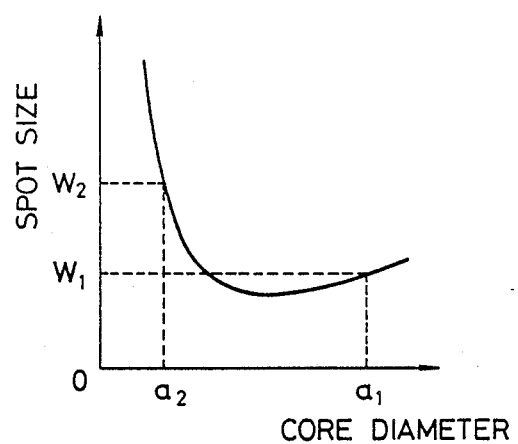
FIG. 4 is a graph showing the relationship between the core diameter and sPot size of an optical fiber.
Figure 5:
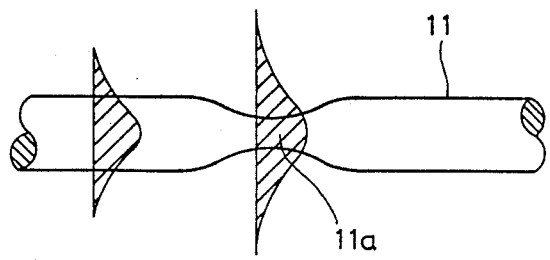
FIG. 5 is an enlarged, partial plan view showing the outer configuration of an optical fiber, the intermediate portion of which is reduced in diameter, and a change in broadening of light along the optical axis of the optical fiber.

An optical component of the present invention is based on the following understandings. The relationship between the core diameter of an optical fiber and the spot size thereof (the degree of broadening of a light beam) is illustrated in FIG. 4. If the core diameter is reduced from $a_1$ to $a_2$, for example, the spot size first decreases with reduction of the core diameter, but starts increasing after the core diameter is reduced beyond a certain extent, due to a drop of the light confining function. Accordingly, if a portion of an optical fiber 11 is heated and drawn to be substantially fine, as shown in FIG. 6, the spot size of this portion becomes greater than that of the remaining portion. In the meantime, it is known that an angle $\theta$ of propagation of light inside an optical fiber is almost inversely proportional to the spot size. From this it follows that, in the optical fiber 11 shown in FIG. 5, the propagation angle $\theta$ of light is smaller at the small-diameter portion 11a than at the remaining portion. Therefore, by arranging an optical thin film, such as a filter film, in this position, it is possible to lessen the narrowing of the flat portion shown in FIG. 2.

Since no lens is used, the optical component described above is inexpensive and can be miniaturized, and further it has excellent optical properties against a gap or misalignment between optical fibers, etc., due to the arrangement of the optical thin film at the spot-size enlarged portion of the optical fiber.

Figure 6A:
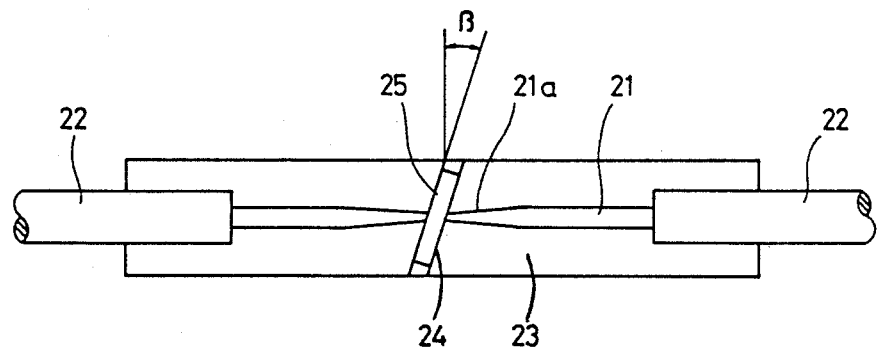
FIG. 6A is a plan view of an optical filter according to one embodiment of the invention.
Figure 6B:
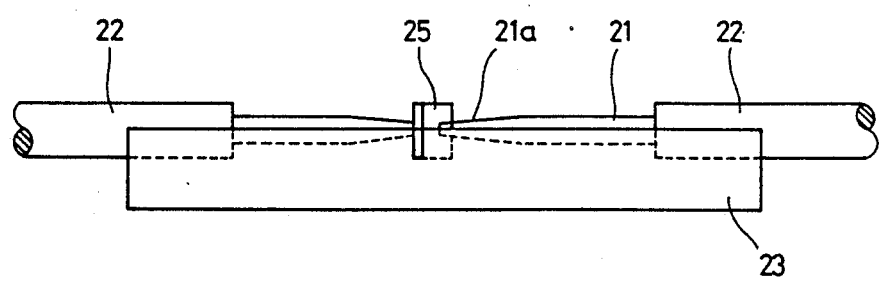
FIG. 6B is a side view of the optical filter in FIG.6A.

FIGS. 6A and 6B show an optical filter according to one embodiment of the present invention. This optical filter is produced as follows. A portion (intermediate portion) of an optical fiber 21, a sheath 22 of which has been removed, is heated and drawn to form a small-diameter portion 21a, and the optical fiber 21 is, together with its sheath 22 on opposite sides, secured to a base member 23 by an optical adhesive, glass soldering or the like. A slit 24 is formed in the base member 23 across the small-diameter portion 21a of the optical fiber, and a filter chip 25 is fitted and secured in the slit 24.

Figure 7:
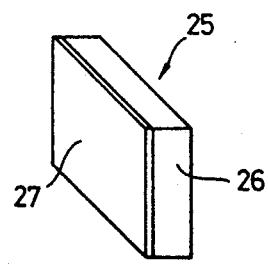
FIG. 7 is a perspective view of a filter chip used in the optical filter of FIG. 6A.

The filter chip 25 comprises, as shown in FIG. 7, a glass plate 26, and a filter film 27 formed on one side surface of the glass plate 26 by vacuum evaporation, for transmitting light with a specific wavelength therethrough. If the filter film 27 passes light with wavelength $\lambda_1$ therethrough and reflects light with wavelength $\lambda_2$, then the optical filter functions as an optical filter for the wavelength $\lambda_1$. By inclining the filter chip 25 at an angle $\beta$ (e.g., 8°) to a plane perpendicular to the optical axis of the optical fiber 21, it is possible to avoid the reflected light from the filter chip 25 being propagated back through the optical fiber.

Figure 8:
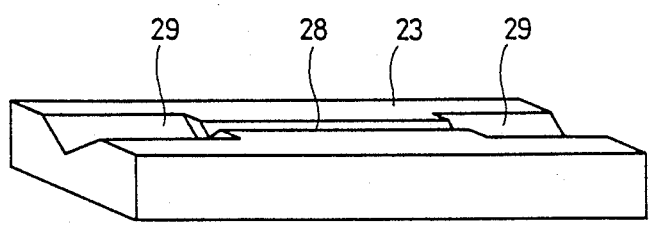
FIG. 8 is a perspective view of a base member for the optical filter of FIG. 6A.
Figure 9:
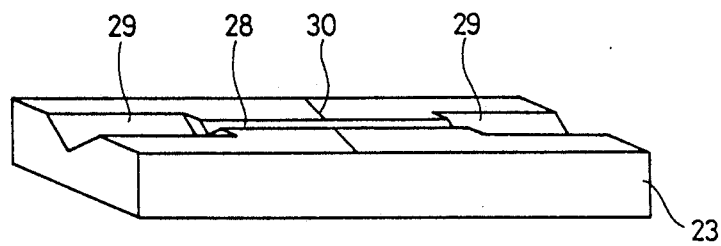
FIG. 9 is a perspective view showing a modification of the base member.
Figure 10:
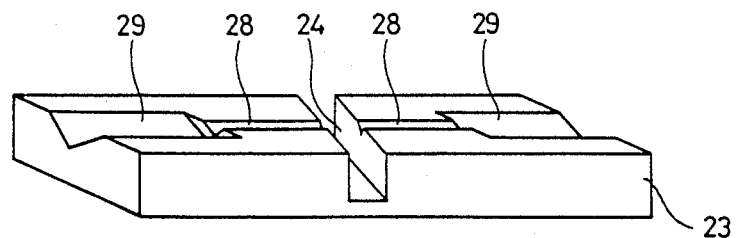
FIG. 10 is a perspective view showing still another modification of the base member.

As shown in FIG. 8, the base member 23 comprises a block, in the upPer surface of which are formed a V-groove 28 for receiving an optical fiber, and V-grooves 29 for receiving a sheath. For the convenience of angle adjustment during the formation of the slit, a guide line 30 may be out in the upper surface of the base member 23, as shown in FIG. 9. Instead of the base member of FIG. 8 or 9, a base member 23 shown in FIG. 10, in which a slit 24 is formed beforehand, may be used.

Figure 11:
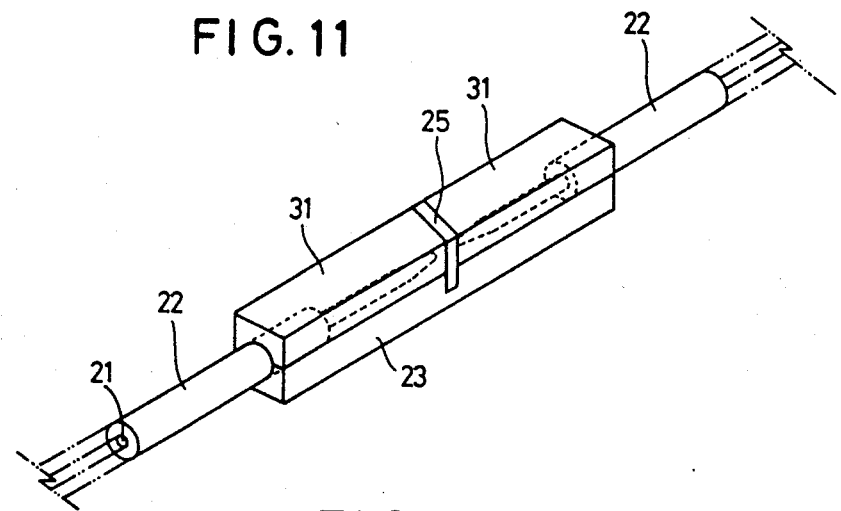
FIG. 11 is a perspective view showing the optical filter of FIG. 6A, with a cover mounted thereto.

FIG. 11 illustrates the optical filter shown in FIGS. 6A and 6B, with a cover 31 mounted thereto for protection of the optical fiber 21 and the filter chip 25.

Next, an optical filter produced on an experimental basis will be described. The trial optical filter was produced as follows. An intermediate portion of an optical fiber with an outer diameter of 125 $\mu$m was heated and drawn to form a small-diameter portion having an outer diameter of 40 $\mu$m. After the intermediate portion of the fiber was secured on a base member, a slit of 30 $\mu$m wide was formed at an angle of 8° with respect to a plane perpendicular to the optical axis of the small-diameter portion, by the micro-lapping technique disclosed in Paper No. 838, National Convention Record of Institute of Electronics, Information and Communication Engineers of Japan, 1986. A filter chip, on which a band-pass filter film passing light with a wavelength of 1.55 $\mu$m therethrough had been formed by vacuum evaporation, was fitted and secured in the slit, thus obtaining an optical filter for the wavelength 1.55 $\mu$m. With this manufacturing process, low-loss optical filters with an insertion loss of about 0.3 dB could be produced with excellent reproducibility. A cover as shown in FIG. 11 was mounted to the trial optical filter, and further a heat-shrinkable tube was fitted around the cover and base member. The optical filter with the cover and the tube had overall dimensions of about 4×4×25 mm and thus was very compact.

The above-described manufacturing process comprises cutting the small-diameter portion of the optical fiber secured to the base member, and inserting a filter chip between the out fiber ends. Therefore, no optical axis adjustment which involves complicated work, or additional parts such as a lens are required, whereby inexpensive and small-sized optical components can be provided. Furthermore, since the filter chip is arranged at the spot-size enlarged portion of the optical fiber, an excellent filter characteristic is achieved.

Figure 12A:
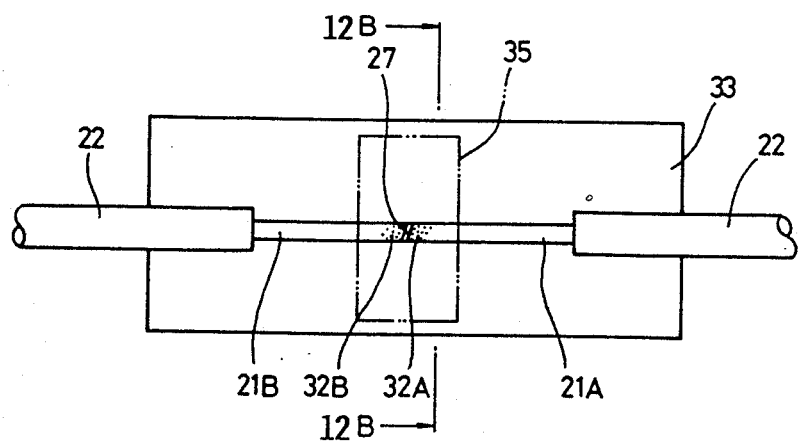
FIG. 12A is a plan view of an optical filter according to another embodiment of the invention.
Figure 12B:
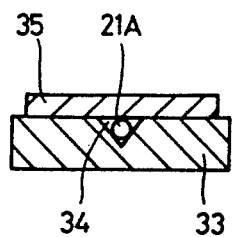
FIG. 12B is a sectional view taken along 12B 12B in FIG. 12A.
Figure 13A:
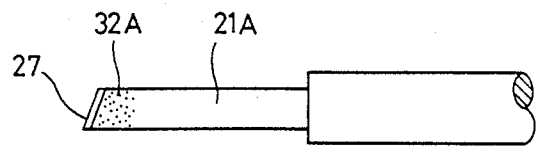
FIGS. 13A and 13B are a plan view and a side view, respectively, of one of the optical fibers used in the optical filter of FIG. 12A, showing one end thereof.
Figure 13B:
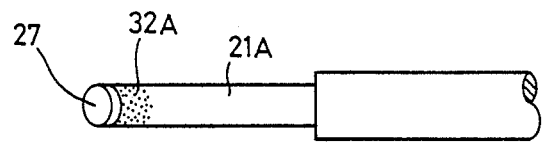

FIGS. 12A and 12B show another embodiment of the invention. An optical filter of this embodiment is produced as follows. The dopant of the fiber core at one end Portion of each of two optical fibers 21A and 21B is diffused outwardly while heating the fibers, thereby forming a spot-size enlarged portion 32A, 32B at the fiber end. After a filter film 27 is formed on the end face of one optical fiber 21A, as shown in FIGS. 13A and 13B, both the fibers 21A and 21B are placed in a V-groove 34 for axis alignment, formed in a guide member 33. The end faces of the fibers 21A and 21B are abutted against each other, followed by alignment of the axes, and thereafter the fibers are secured to the guide member 33 by an optical adhesive, for example. A covering member 35 is fixed to cover the fiber ends.

In the above manufacturing process, the core dopant at one end portion of each optical fiber is diffused to form a spot-size enlarged portion, and the end faces of the fibers are abutted against each other with an optical member interposed therebetween, and are joined together. Alternatively, the core dopant at an intermediate portion of a single fiber may be diffused outwardly while heating the fiber, thereby forming a spot-size enlarged portion. After securing the optical fiber on a base member, a slit is formed across the spot-size enlarged portion of the fiber and then a filter chip is fitted and secured in the slit, as in the process shown in FIGS. 6A and 6B.

In the foregoing embodiments, a filter film is used as the optical thin film. Alternatively, a light absorbing film for attenuating light may be used as the optical thin film, in which case an optical attenuator can be provided without the need for changing the arrangement. Further, if a polarization maintaining fiber is used as the optical fiber and a polarization splitting film as the optical thin film, a polarizer can be provided.

Figure 14:
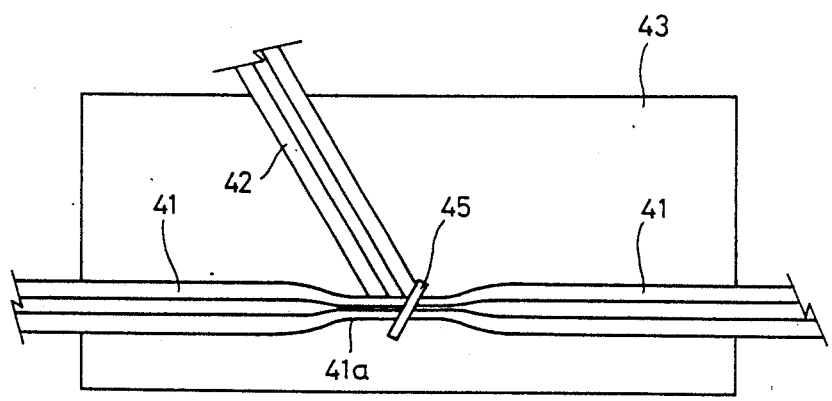
FIG. 14 is a plan view of a wavelength division multiplexer/demultiplexer according to still another embodiment of the invention.
Figure 15:
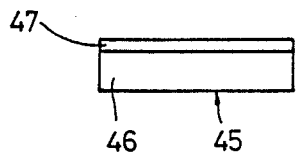
FIG. 15 is a side view of a filter chip used in the wavelength division multiplexer/demultiPlexer of FIG. 14.

FIG. 14 illustrates a wavelength division multiplexer/demultiplexer according to another embodiment of the invention. The wavelength division multiplexer/demultiplexer is produced as follows. A main-path optical fiber 11 having a small-diameter portion 41a, which is formed by heating and drawing an intermediate portion of the fiber, is secured to a base member 48, and a slit is formed across the small diameter portion 41a. A filter chip 45 is fitted and secured in the slit, and a branch-path optical fiber 42 is secured to the base member 43 such that the reflected light from the filter chip 45 is incident to one end of the branch-path optical fiber 42. For the main-path optical fiber 41, an optical fiber with a spot size of 5.6 μm and an outer diameter of 125 μm was used, and a portion of the optical fiber was heated and drawn to form the small-diameter portion 41a having a spot size of 10 μm and an outer diameter of 40 μm. The filter chip 45 comprises, as shown in FIG. 15, a transparent plate 46, and a dielectric multilayer film 47 as the filter film, formed on one surface of the transparent plate 46 for transmission of light with a wavelength of 1.5 μm.

The wavelength division multiplexer/demultiplexer of the above-described arrangement was evaluated as to the wavelength-transmissivity characteristic, by transmitting light through the main-path optical fiber 41, and it had a passing bandwidth of 24 nm. In contrast, a prior art wavelength division multiplexer/ demultiplexer using the same optical fiber and filter chip (in this case, no small-diameter portion is formed in the main-path optical fiber) had a passing bandwidth of 18 nm. The filter chip used had a passing bandwidth of 27 nm for parallel rays of light. Thus, the wavelength division multiplexer/demultiplexer of the invention has a remarkably improved passing bandwidth as compared to that of the prior art wavelength division multiplexer/demultiplexer, which, though, is not equal to the passing bandwidth obtained when parallel light rays are incident to the filter chip. Here, the passing bandwidth is defined as the wavelength bandwidth of passed light whose transmissivity is 90% or more of the maximum transmissivity of the passed light.

To enlarge the spot size, the core dopant at a specific portion of the optical fiber is diffused radially outwardly while heating the fiber, as described above. In this case, the amount of the dopant is in proportion to $a^2 \times \Delta$ (a: the core diameter; $\Delta$: the difference in specific refractivity). Therefore, if the difference of specific refractivity $\Delta$ is reduced to half due to outward diffusion of the dopant, the core diameter a and accordingly the spot size increase $\sqrt{2}$ times, as seen from the above relationship. In the case of using $GeO_2$ as the core dopant, such core diameter and spot size are obtained by locally heating the optical fiber at 1300° C. for about 5 hours.

What is claimed is:

1. An optical component for use in optical transmission lines, comprising:
   an optical fiber having a spot-size enlarged portion in which a spot size is enlarged at an intermediate portion of the optical fiber; and
   an optical member comprising a thin film element arranged across said spot-size enlarged portion of the optical fiber, said thin film element including means for optically operating on light transmitted to said spot-size enlarged portion of the optical fiber.

2. The optical component according to claim 1, wherein said thin film element comprises a filter film for transmitting light with a specific wavelength therethrough, said optical component functioning as an optical filter.

3. The optical component according to claim 1, wherein said think film element comprises a light absorbing film for attenuating light, said optical component functioning as an optical attenuator.

4. The optical component according to claim 1, wherein said optical fiber comprises a polarization maintaining fiber, said thin film element comprising a polarization splitting film, and said optical component functioning as a polarizer.

5. The optical component according to claim 1, wherein:
   said optical fiber comprises a main-path optical fiber,
   a branch-path optical fiber is provided which has an end face opposed to a peripheral surface of said spot-size 6. A method of manufacturing an optical component, comprising the steps of:

securing an optical fiber having a spot-size enlarged portion in which a spot size is enlarged, to a base member;

forming a slit across said spot-size enlarged portion of the optical fiber; and fitting an optical member in said slit.

7. The method according to claim 6, wherein said spot-size enlarged portion is formed by heating and drawing an intermediate portion of said optical fiber.

8. The method according to claim 6, wherein said spot-size enlarged portion is formed by diffusing core dopant at an intermediate portion of said optical fiber radially outwardly while heating the same.

9. A method of manufacturing an optical component, comprising the steps of:

preparing a pair of optical fibers, each having a spot-size enlarged end portion where a spot size is enlarged, and a base member having a guide groove;

placing said optical fibers in said guide groove, with faces of said spot-size enlarged end portions opposed to each other;

aligning axes of said optical fibers with an optical member interposed between the opposed end faces of said optical fibers; and securing said optical fibers and said optical member to said base member.

10. The method according to claim 9, wherein said spot-size enlarged end portion of each of said optical fibers is formed previously by diffusing core dopant at one end portion of an optical fiber radially outwardly while heating the same to enlarge a spot size of the end portion.

* * * * *

UNITED STATES PATENT AND TRADEMARK OFFICE
CERTIFICATE OF CORRECTION

PATENT NO.  : 4,958,897
DATED       : September 25, 1990
INVENTOR(S) : YANAGAWA et al.

It is certified that error appears in the above-indentified patent and that said Letters Patent is hereby corrected as shown below:

Column 6, line 53 (claim 3), "think" should be --thin--

Column 6, line 66 (claim 5), after "spot-size", insert:

--enlarged portion of said main-path optical fiber and which has an optical axis inclined with respect to an optical axis of said main-path optical fiber, said thin film element comprising a filter film which transmits light with a specific wavelength therethrough and which reflects light with wavelengths other than said specific wavelength, said thin film element being arranged at the spot-size enlarged portion and inclined with respect to the optical axis of said main-path optical fiber, and the optical axes of said main-path optical fiber and said branch-path optical fiber being aligned with each other through said optical member, whereby said optical component functions as a wavelength division multiplexer/demultiplexer.--

Signed and Sealed this

Twenty-second Day of July, 1997

Attest:

BRUCE LEHMAN

Attesting Officer

Commissioner of Patents and Trademarks